March 5, 1929.  C. G. JOHANNESMEYER  1,704,324
METAL PLANING MACHINE
Filed July 20, 1925
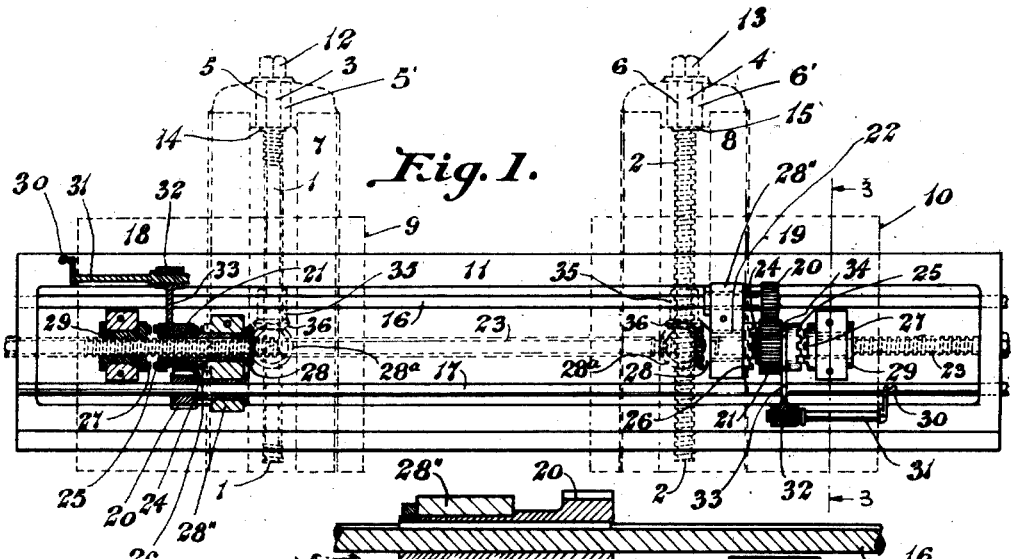
Charles G. Johannesmeyer.
By James N. Ramsey
Attorney Patented Mar. 5, 1929.

1,704,324

UNITED STATES PATENT OFFICE.

CHARLES G. JOHANNESMEYER, OF GLENDALE, OHIO, ASSIGNOR TO THE LIBERTY MACHINE TOOL COMPANY, OF HAMILTON, OHIO, A CORPORATION OF OHIO.

METAL-PLANING MACHINE.

Application filed July 20, 1925. Serial No. 44,772.

My invention particularly relates to metal planing machine slide and cross rail movement mechanism.

Heretofore it has been customary to provide a rotatable screw mounted on the cross rail of said machine for each head, whereby, through engaging mechanism, the respective slides are adapted to be moved vertically and the respective heads are adapted to be moved longitudinally of said cross rail. When rotatable screws are utilized for imparting longitudinal movement to the rail heads of a metal planing machine it is necessary to provide a rotatable screw for each head positioned on the cross rail. Furthermore, rotatable screws being rotatably mounted necessarily are loosely connected and considerable less stability is afforded the cutting tool than by the use of stationary screws. For various reasons it is especially advantageous to provide metal planing machine mechanism adapted to maintain the cutting tool in stabilized position thereby reducing its vibration to a minimum whereby the finished product is smooth and free from indentations caused by "chattering" of the tool. The greater the stability of the tool results proportionally lower cost of manufacturing highly efficient articles particularly for the reason that it is possible to take heavy cuts at high speed from the work without damaging the metal planing machine or tool caused by excessive vibration. The use of rotatable screws for elevating and lowering the respective slides relative to the heads and for imparting horizontal movement to the heads necessitates considerable mechanism which not only materially adds to the weight of the machine but also requires constant attention for adjusting, repairing, oiling and inspecting the parts, all of which consumes the time of a metal planing machine operator and decreases the quantity of the work produced, thereby increasing the manufacturing cost, as well as increasing the cost of operation of the machine, due to the excessive weight of the moving mechanism.

The objects of my invention are to provide simple, efficient and practical means for elevating and lowering the slides relative to the respective heads of a metal planing machine and for imparting horizontal movement of the heads relative to the cross rail; to provide single manually operative means capable of controlling the movement of one slide and one head; to provide means adapted to materially increase the stability and reduce the vibration of the tools and other parts of a metal planing machine, whereby heavy cuts at relatively high speeds may be taken from the work without the likelihood of "chattering" of the tool and permitting the production of uniformly perfect work; to provide means adapted to eliminate the usual loosely mounted rotatable slide vertical movement and rail head horizontal movement mechanism and to substitute therefor stationary screws securely fixed to parts of said machine, thereby materially increasing the strength and stability of said mechanism; and to provide means adapted to greatly simplify and materially reduce the manufacturing cost and the operative cost of said machine.

My invention consists in providing stationary vertical screws connected with the respective slides of a metal planing machine; in providing a single stationary horizontal screw fixed to the cross rail of said machine irrespective of the number of rail heads; in providing mechanism capable of operative connection with either the horizontal screw or one of said vertical screws whereby an operator of said machine may either impart horizontal movement to one of said heads or vertical movement to one of said slides by manual operation of a single control lever.

My invention further consists in the combination, arrangement, location of parts and in the details of construction, as herein set forth and claimed.

In the drawings:

Fig. 1 is a front elevation of parts of a metal planing machine having my invention embodied therein and showing parts in section, parts partly broken away and parts in dotted lines;

Fig. 2 is an enlarged longitudinal vertical section of the right hand clutch and parts relative thereto, some of which appear in elevation;

Fig. 3 is a section taken on a plane corresponding to line 3—3 in Fig. 1;

Fig. 4 is a vertical section of the left hand tool slide and parts relative thereto taken through the stationary vertical screw part of which appears in elevation.

In the preferred construction of my invention I provide stationary screws 1 and 2, respectively, having their upper ends 3 and 4, respectively, received in holes 5 and 6, respectively, in webs 5' and 6', respectively, integral with tool slides 7 and 8, respectively, of rail heads 9 and 10 slidably mounted on cross rail 11. Screws 1 and 2 are mounted in stationary fixed relation to slides 7 and 8 as by nuts 12 and 13, respectively being threaded to upper ends 3 and 4 of the screws, whereby integral collars 14 and 15, respectively, of screws 1 and 2, respectively, are drawn into close engagement with the lower sides of webs 5' and 6'.

Driving shafts 16 and 17 rotatably mounted in cross rail 11 are connected with suitable outside source of power supply. The driving shafts 16 and 17, respectively, are suitably connected with heads 9 and 10 for the purpose of elevating and lowering slides 7 and 8, respectively, on saddles 18 and 19, respectively, of heads 9 and 10 and for sliding the heads on cross rail 11 as will hereinafter be explained.

As heads 9 and 10 are similarly constructed and mechanically connected in the same manner with cross rail 11 a detailed description of head 10 together with explanations of the connecting mechanism will suffice for both of the heads.

Driving gear 20 keyed to driving shaft 16 is in permanent mesh with clutch gear 21 rotatably mounted on sleeve or shank 22 mounted on horizontal screw 23 suitably fixed to cross rail 11. The clutch teeth 24 and 25, respectively, are adapted to mesh with clutch teeth 26 and 27, respectively, of sleeve gear 28 and nut 29 threaded to screw 23. Hand lever 30 is fixed to shaft 31 threaded to nut 32 fixed to fork 33 received in circumferential groove 34 in clutch gear 21, whereby manual operation of lever 30 is adapted to slide clutch gear 21 on sleeve 22. Threaded to screw 2 is nut 35 secured against vertical movement relative to slide 8. Fixed to the lower part of nut 35 is gear 36 which gear is in permanent engagement with double gear 28$^a$, said gear 28$^a$, in turn, meshing with gear 28, the latter gear having integral sleeve 22 rotatably mounted in block 28'' fixed to saddle 19, whereby manual operation of lever 30 is adapted to cause clutch teeth 24 of clutch gear 21 to engage teeth 26 integral with gear 28 and elevate and lower slide 8 relative to saddle 19. Movement of lever 30 in a direction to cause teeth 25 of clutch gear 21 to engage teeth 27 of nut 29 rotatably secured to saddle 19, thereby causes rotation of nut 29 threaded to screw 23 suitably fixed to cross rail 11, whereby the head is caused to slide on cross rail 11.

The mechanical operations of my invention are as follows:

Assume it is desired to elevate slide 8 on head 10. Lever 30 is directionally operated whereby teeth 24 integral with clutch gear 21 is caused to mesh with clutch teeth 26 integral with or suitably fixed to gear 28 in permanent mesh with gear 36 fixed to nut 35 threaded to screw 2 fixed to slide 8. Suitable power is applied to driving shaft 16 whereby a required directional rotation is imparted to driving gear 20 keyed to the driving shaft and in permanent meshing relation with clutch gear 21 whereby slide 8 is elevated or lowered depending upon the direction of rotation of driving shaft 16.

When it is desired to slide rail head 10 horizontally on cross rail 11 hand lever 30 is manually operated for engaging teeth 25 of clutch gear 21 with teeth 27 of nut 29 threaded to horizontal screw 23 fixed to the cross rail, whereby head 10 is slid longitudinally on the cross rail, since nut 29 is rotatably secured to saddle 19 of head 10.

It is apparent that I have invented a simple and practical invention for the purpose of elevating and lowering the respective slides of metal planing machine rail heads and for imparting horizontal movement to the respective heads relative to the cross rail by manual operation of a single control lever for each head, whereby the operator of the machine may remain in one position for accomplishing the purpose of imparting horizontal movement to a rail head relative to the cross rail or for elevating and lowering its tool slide.

A particular advantage of my invention is that the screws 1, 2 and 23 are stationary and permanently fixed relative to certain parts of the machine whereby minimum vibration is imparted to the machine and to the cutting tool, thereby permitting relatively deep cuts to be taken from the work at high speeds.

The substitution of stationary screws for the usual rotatably mounted and loosely connected screws materially adds to the sturdiness of construction and durability of a metal planing machine particularly for the reason that securely fixed stationary screws are adapted to effectively resist thrust. My invention also is capable of being operated quickly and efficiently as an operator is not compelled to control the vertical movement of a tool slide by manually operative means differently positioned from the manually operative means for controlling the horizontal movement of the head containing the slide. Furthermore, inconvenient operation of the controlling mechanism of a metal planing machine which necessitates continuous movement of the operator from one position to another, for the purpose of controlling the various movable parts of the machine for properly positioning the cutting tool relative to the work, often results in inefficient and damaging operation of the machine as many operators are inclined to operate a machine in the most convenient manner irrespective of the likelihood of inefficiently produced work or damage to the mechanism.

I have found that the form of my invention illustrated in the drawings and referred to in the above description is the most efficient and practical and, therefore, it is my preferred embodiment, but while I have chosen to illustrate the form and construction of my invention by the herein drawings and explanation of the same, the form and explanation, as relates thereto, is not intended to include all of the structures in which my invention may be incorporated. It is understood that my invention resides in the combination, arrangement of parts and in the details of construction, as hereinafter claimed, and that changes in the precise embodiment of the invention can be made within the scope of what is claimed without departing from the spirit of the invention.

What I claim as new and desire to secure by Letters Patent is:

1. In combination with a metal planing machine, a cross rail mounted thereon, a pair of heads slidably mounted on said cross rail and each comprising a saddle and a tool slide slidably mounted on said saddle, a stationary screw fixed to each of said slides, a pair of driving shafts rotatably mounted on said cross rail, a stationary screw fixed to said cross rail, a pair of nuts threaded to said last screw and fixed to said heads, respectively, clutch means on each of said last nuts and a pair of manually operative controlling means capable of operatively connecting said clutch means with said driving shafts, respectively, whereby said heads are adapted to be selectively slid on said cross rail and also capable of operatively connecting said nut gears with said driving shafts whereby said slides are adapted to be elevated and lowered.

2. In combination with a metal planing machine, a cross rail slidably mounted thereon, a head slidably mounted on said cross rail and comprising a saddle and a tool slide slidably mounted on said saddle, a stationary screw fixed to said slide, a nut threaded to said screw, a nut gear on said nut, a driving shaft rotatably mounted on said cross rail, a stationary screw fixed to said cross rail, a nut threaded to said last screw, clutch teeth on said last nut and manually operative means capable of operatively connecting said clutch teeth with said driving shaft whereby said head is adapted to be slid longitudinally on said cross rail and also capable of operatively connecting said nut gear with said driving shaft whereby said slide is elevated and lowered.

3. In combination with a metal planing machine, a cross rail mounted thereon, a head slidably mounted on said cross rail and comprising a saddle and a tool slide slidably mounted on said saddle, a stationary screw fixed to said slide, a nut threaded to said screw, a nut gear integral with said nut, a stationary screw fixed to said cross rail, a sleeve gear rotatably mounted on said last screw and in mesh with said nut gear and having clutch teeth thereon, a driving shaft, a driving gear fixed to said shaft, a clutch gear slidably and rotatably mounted on said last screw and in permanent mesh with said driving gear, manually operative means for sliding said clutch gear into clutching engagement with said sleeve gear whereby vertical movement is imparted to said slide, and a nut threaded to said last screw and having clutch teeth integral therewith and adjacent said clutch gear whereby operation of said manually operative means is adapted to impart horizontal movement to said head.

4. In combination with a metal planing machine, a cross rail mounted thereon, a head slidably mounted on said cross rail and comprising a saddle and a tool slide slidably mounted on said saddle, a stationary screw fixed to said slide, a nut threaded to said screw, a nut gear thereon, a stationary screw fixed to said cross rail, a sleeve gear rotatably mounted on said last screw and in permanent mesh with said nut gear and having clutch teeth integral therewith, a driving shaft, a driving gear fixed to said shaft, a clutch gear slidably and rotatably mounted on said last screw and in permanent mesh with said driving gear, manually operative means for sliding said clutch gear into clutching engagement with said sleeve gear whereby vertical movement is imparted to said slide and mechanism operatively connected with said driving shaft and said last screw whereby operation of said manually operative means is adapted to impart horizontal movement to said head.

5. In combination with a metal planing machine, a cross rail mounted thereon, a head slidably mounted on said cross rail and comprising a saddle and a tool slide slidably mounted on said saddle, a stationary screw fixed to said slide, a nut threaded to said screw, a nut gear integral with said nut, a stationary screw fixed to said cross rail, a sleeve gear rotatably mounted on said last screw and in permanent mesh with said nut gear and having clutch teeth thereon, a driving shaft, a driving gear fixed to said shaft, a clutch gear slidably and rotatably mounted on said last screw and in permanent mesh with said driving gear, manually operative means for sliding said clutch gear into clutching engagement with said sleeve gear whereby vertical movement is imparted to said slide and mechanism operatively connected with said driving shaft and said last screw, whereby operation of said manually operative means is adapted to impart horizontal movement to said head.

6. In combination with a metal planing machine, a cross rail mounted thereon, a head mounted on said cross rail and consisting of a saddle and a tool slide slidably mounted on said saddle, a stationary screw fixed to said slide, a nut threaded to said screw, a nut gear integral with said nut, a stationary screw fixed to said cross rail, a sleeve gear rotatably mounted on said screw and in permanent mesh with said nut gear and having clutch teeth integral therewith, a driving shaft, a driving gear fixed to said shaft, a clutch gear slidably and rotatably mounted on said last screw and in permanent mesh with said driving gear, means for sliding said clutch gear into clutching engagement with said sleeve gear whereby vertical movement is imparted to said slide and a nut threaded to said last screw and having a clutch integral therewith adapted to be engaged by said clutch gear whereby operation of said means in one direction is adapted to impart horizontal movement to said head.

7. In combination with a metal planing machine, a cross rail mounted thereon, a pair of heads slidably mounted on said cross rail and each consisting of a saddle and a tool slide slidably mounted thereon, a stationary screw fixed to each of said slides, a nut threaded to each of said screws, a nut gear integral with each of said nuts, a stationary horizontal screw fixed to said cross rail, a pair of spaced apart sleeve gears rotatably mounted on said horizontal screw and fixed to said heads, respectively, and in mesh with said nut gears, respectively, and having clutch teeth integral therewith, a pair of driving shafts, a pair of driving gears fixed to said shafts, respectively, a pair of clutch gears slidably and rotatably mounted on said horizontal screw and in permanent mesh with said driving gears, respectively, manually operative means connected with said clutch gears, respectively, whereby said clutch gears are adapted to be slid into clutching engagement with said sleeve gears, respectively, whereby vertical movement is imparted to said slide, a pair of nuts threaded to said horizontal screw and each having clutch teeth thereon and positioned adjacent said clutch gears, respectively, and fixed to said heads, respectively, whereby operation of said manually operative means is adapted to impart horizontal movement to said heads independently of each other.

CHARLES G. JOHANNESMEYER.